United States Patent
K et al.

(10) Patent No.: US 10,841,210 B2
(45) Date of Patent: *Nov. 17, 2020

(54) SERVICE FUNCTION PROXY PERFORMANCE IN SOFTWARE DEFINED NETWORKS

(71) Applicant: Telefonaktiebolaget LM Ericsson (publ), Stockholm (SE)

(72) Inventors: Faseela K, Bangalore (IN); Ashutosh Bisht, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,556

(22) Filed: Jun. 27, 2019

(65) Prior Publication Data

US 2019/0319879 A1 Oct. 17, 2019

Related U.S. Application Data

(63) Continuation of application No. 16/320,988, filed as application No. PCT/IB2016/055118 on Aug. 26, 2016, now Pat. No. 10,382,325.

(51) Int. Cl.
*H04L 12/721* (2013.01)
*H04L 12/725* (2013.01)
(Continued)

(52) U.S. Cl.
CPC .......... *H04L 45/38* (2013.01); *H04L 12/4633* (2013.01); *H04L 12/4645* (2013.01);
(Continued)

(58) Field of Classification Search
CPC ............. H04L 12/4633; H04L 12/4645; H04L 29/0863; H04L 45/306; H04L 45/38; H04L 67/2823; H04L 67/327; H04L 45/64

See application file for complete search history.

(56) References Cited

U.S. PATENT DOCUMENTS 10,116,553 B1 10/2018 Penno et al.
10,171,350 B2 1/2019 Penno et al.
(Continued)

FOREIGN PATENT DOCUMENTS

CN 104639414 A 5/2015
WO 2015041706 A1 3/2015

OTHER PUBLICATIONS

Benson, et al., "Network Traffic Characteristics of Data Centers in the Wild," ACM, IMC'10, Nov. 1-3, 2010, Melbourne, Australia, 14 pages.
(Continued)

*Primary Examiner* — George C Neurauter, Jr.
(74) *Attorney, Agent, or Firm* — Sage Patent Group

(57) ABSTRACT

A software defined networking (SDN) system includes a switch, a service function chain (SFC) proxy, and a controller communicatively coupled to the SFC proxy and the switch. The controller is configured to obtain a translation rule for a SFC encapsulation provided by the SFC proxy, responsive to obtaining the translation rule transmit one or more instructions to the switch to program the switch to translate packets belonging to a flow associated with the SFC encapsulation according to the translation rule and to forward the packets belonging to the flow associated with the SFC encapsulation to a service function (SF) in a manner that causes the packets belonging to the flow associated with the SFC encapsulation to bypass the SFC proxy, and transmit an indication to the SFC proxy that the packets belonging to the flow associated with the SFC encapsulation are to bypass the SFC proxy.

20 Claims, 11 Drawing Sheets

(51) Int. Cl.
*H04L 12/715* (2013.01)
*H04L 12/46* (2006.01)
*H04L 29/08* (2006.01)

(52) U.S. Cl.
CPC ........ *H04L 29/0863* (2013.01); *H04L 45/306* (2013.01); *H04L 45/64* (2013.01); *H04L 67/2823* (2013.01); *H04L 67/327* (2013.01)

(56) References Cited

U.S. PATENT DOCUMENTS

| 10,382,325 | B2* | 8/2019 | K ............................ H04L 45/64 |
|---|---|---|---|
| 2015/0092564 | A1 | 4/2015 | Aldrin et al. |
| 2016/0119253 | A1 | 4/2016 | Kang et al. |
| 2016/0366191 | A1 | 12/2016 | Patil et al. |
| 2017/0317926 | A1 | 11/2017 | Penno et al. |
| 2017/0339130 | A1 | 11/2017 | Reddy et al. |
| 2018/0295053 | A1 | 10/2018 | Leung et al. |
| 2019/0068490 | A1 | 2/2019 | Penno et al. |

OTHER PUBLICATIONS

Casado, et al., "Of Mice and Elephants," Network Heresy, Nov. 1, 2013, https://networkheresy.com/2013/11/01/of-mice-and-elephants/, 7 pages.

ETSI Draft, "A.1 NFV ISG PoC Proposal; NFV(15) 000013r1_Scablable_Service_Chaining_Technology_for_Flexible_Use_of_Net," European Telecommunications Standard Institute (ETSI), vol. ISG-NFV, Feb. 6, 2015, 8 pages.

ETSI, "EVE_WG_10_Sanya_Agenda; NFVEVE(15)000209_NFV_10_Meeting_Report," Vice-Chairman, J. Maisonneuve, ISG-NFV, May 19, 2015, 16 pages.

Fu, et al., "The topology of service function chaining draft-fu-sfc-topology-01," IETF, Internet-Draft, Oct. 14, 2015, 10 pages.

Graf, et al., "SFC with NSH and OVS," OpenvSwitch.org, A Linux Foundation Collaborative Project, Nov. 16, 2015, downloaded from http://openvswitch.org/support/ovscon2015/16/1040-elzur.pdf, 15 pages.

Halpern, et al., "Request for Comments 7665: Service Function Chaining (SFC) Architecture", Oct. 2015, 32 pages.

Halpern, et al., "Service Function Chaining (SFC) Architecture draft-ietf-sfc-architecture-07," IETF, Network Working Group, Internet-Draft, Mar. 6, 2015, 28 pages.

Quinn, et al., "Network Service Header draft-ietf-sfc-nsh-05.txt," IETF Trust, Service Function Chaining, Internet-Draft, May 26, 2016, 38 pages.

Quinn, et al., "Network Service Header", Network Working Group Internet-Draft, draft-quinn-sfc-nsh-07, 2015, 43 pgs.

Song, et al., "SFC Header Mapping for Legacy SF draft-song-sfc-legacy-sf-mapping-07," SF working group, Internet-Draft, IETF, Apr. 5, 2016, 17 pages.

\* cited by examiner

SERVICE FUNCTION PROXY PERFORMANCE IN SOFTWARE DEFINED NETWORKS

CROSS-REFERENCE TO RELATED APPLICATIONS

This application is a continuation of U.S. application Ser. No. 16/320,988, which is a national stage of International Application No. PCT/IB2016/055118, filed Aug. 26, 2016, which are hereby incorporated by reference.

TECHNICAL FIELD

Embodiments of the invention relate to the field of computer networks, and more specifically, to improving service function proxy performance in Software Defined Networking (SDN) networks.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

A Service Function Chain (SFC) defines an ordered set of abstract service functions. A service function is a function that is responsible for specific treatment of received packets. A service function can act at various layers of a protocol stack (e.g., at the network layer or other Open Systems Interconnection (OSI) layers). A non-exhaustive list of abstract service functions includes firewalls, Deep Packet Inspection (DPI), Lawful Intercept (LI), server load balancing, and Network Address Translation (NAT).

In traditional non-SDN networks, building SFCs requires various manual steps such as configuring routing/switching policies and Access Control Lists (ACLs). Building and configuring SFCs is greatly simplified with SDN capabilities. In an SDN environment, the switches typically act as Service Function Forwarders (SFF). An SFF is connected to one or more service functions (e.g., firewall, NAT) and is responsible for forwarding traffic to one or more of those service functions, as well as handling traffic coming back from those service functions.

In a typical SFC scenario, a service function classifier classifies an incoming packet based on the contents of the header fields of the packet. Based on the classification, the incoming packet is assigned to an SFC and forwarded to an SFF that is connected to the first service function of the SFC. The SFF then forwards the packet to the first service function of the SFC. After the first service function finishes processing the packet, the service function forwards the packet back to the SFF. The SFF may then forward the packet to an SFF that is connected to the second service function of the SFC so that the packet can be processed by the second service function. A similar process is repeated until the packet traverses all the required service functions of the SFC.

The use of a Network Service Header (NSH) is becoming a popular solution to realize SFCs. This solution introduces a new header, called NSH, that is added onto packets. At ingress, a classifier function classifies the packet and adds an NSH onto the packet based on the classification. The NSH includes information regarding a Service Function Path (SFP). An SFP specifies a particular path in the network that packets must traverse. Once the NSH is added onto the packet, subsequent forwarding of the packet is based on the contents of the NSH. The use of an NSH eliminates the need to reclassify the packet at every SFF. An NSH thus provides the flexibility to classify packets independently from the controller that manages the SFCs. The coordination required between the SDN domain and the SFC domain is the common understanding of the SFPs.

The transition to NSH-based implementations will likely be a gradual process. Both non-NSH-based forwarding and NSH-based forwarding will likely coexist in many commercial deployments. In order for the SFC architecture to support SFC-unaware SFs (e.g., service functions that do not support NSH), a logical SFC proxy function may be employed. The SFC proxy sits on the path between an SFF and an SFC-unaware service function. The SFC proxy accepts packets from the SFF on behalf of the SFC-unaware service function. In the forward direction, the SFC proxy removes the SFC encapsulation (e.g., NSH) from a packet and forwards the packet to the SFC-unaware service function via a transport tunnel (e.g., a local attachment circuit). In the reverse direction, the SFC proxy receives the packet back from the service function, reapplies the SFC encapsulation, and returns the packet to the SFF for further processing along an SFP. Each time a packet needs to be processed by an SFC-unaware service function, the packet is processed by the SFC proxy in both the forward (SFF to SFC-unaware service function) and reverse directions (SFC-unaware service function to SFF), which causes the packet to incur additional latency and consumes valuable bandwidth.

SUMMARY

A method is implemented by a network device functioning as a controller in a Software Defined Networking (SDN) network to configure a switch in the SDN network to process packets on behalf of a Service Function Chain (SFC) proxy so that the packets can bypass the SFC proxy. The method includes receiving a translation rule for an SFC encapsulation from the SFC proxy, transmitting SFC proxy bypass instructions to the switch that cause the switch to translate packets belonging to a flow associated with the SFC encapsulation according to the translation rule for the SFC encapsulation and to forward the packets belonging to the flow associated with the SFC encapsulation to a service function while bypassing the SFC proxy, and transmitting an indication to the SFC proxy that the packets belonging to the flow associated with the SFC encapsulation are to bypass the SFC proxy.

A method is implemented by a network device functioning as a Service Function Chain (SFC) proxy to cause packets in a Software Defined Networking (SDN) network to bypass the SFC proxy, where the SFC proxy is communicatively coupled to a controller in the SDN network. The method includes providing a translation rule for an SFC encapsulation to the controller, receiving an indication from the controller that packets belonging to a flow associated with the SFC encapsulation are to bypass the SFC proxy, and disabling timeout processing for the translation rule for the SFC encapsulation in response to receiving the indication that the packets belonging to the flow associated with the SFC encapsulation are to bypass the SFC proxy.

A network device configured to function as a controller in a Software Defined Networking (SDN) network to configure a switch in the SDN network to process packets on behalf of a Service Function Chain (SFC) proxy so that packets can bypass the SFC proxy. The network device includes a set of one or more processors and a non-transitory machine-readable storage medium having stored therein an SFC proxy bypass component. The SFC proxy bypass component, when executed by the set of one or more processors, causes the network device to receive a translation rule for an SFC encapsulation from the SFC proxy, transmit SFC proxy bypass instructions to the switch that cause the switch to translate packets belonging to a flow associated with the SFC encapsulation according to the translation rule for the SFC encapsulation and to forward the packets belonging to the flow associated with the SFC encapsulation to a service function while bypassing the SFC proxy, and transmit an indication to the SFC proxy that the packets belonging to the flow associated with the SFC encapsulation are to bypass the SFC proxy.

A network device configured to function as a Service Function Chain (SFC) proxy to cause packets in a Software Defined Networking (SDN) network to bypass the SFC proxy, where the SFC proxy is communicatively coupled to a controller in the SDN network. The network device includes a set of one or more processors and a non-transitory machine-readable storage medium having stored therein an SFC proxy bypass component. The SFC proxy bypass component, when executed by the set of one or more processors, causes the network device to provide a translation rule for an SFC encapsulation to the controller, receive an indication from the controller that packets belonging to a flow associated with the SFC encapsulation are to bypass the SFC proxy, and disable timeout processing for the translation rule for the SFC encapsulation in response to receiving the indication that the packets belonging to the flow associated with the SFC encapsulation are to bypass the SFC proxy.

A non-transitory machine-readable medium has computer code stored therein, which when executed by a set of one or more processors of a network device functioning as a controller in a Software Defined Networking (SDN) network, causes the network device to perform operations for configuring a switch in the SDN network to process packets on behalf of a Service Function Chain (SFC) proxy so that packets can bypass the SFC proxy. The operations include receiving a translation rule for an SFC encapsulation from the SFC proxy, transmitting SFC proxy bypass instructions to the switch that cause the switch to translate packets belonging to a flow associated with the SFC encapsulation according to the translation rule for the SFC encapsulation and to forward the packets belonging to the flow associated with the SFC encapsulation to a service function while bypassing the SFC proxy, and transmitting an indication to the SFC proxy that the packets belonging to the flow associated with the SFC encapsulation are to bypass the SFC proxy.

A non-transitory machine-readable medium has computer code stored therein, which when executed by a set of one or more processors of a network device functioning as a Service Function Chain (SFC) proxy, causes the network device to perform operations for causing packets in a Software Defined Networking (SDN) network to bypass the SFC proxy, where the SFC proxy is communicatively coupled to a controller in the SDN network. The operations include providing a translation rule for an SFC encapsulation to the controller, receiving an indication from the controller that packets belonging to a flow associated with the SFC encapsulation are to bypass the SFC proxy, and disabling timeout processing for the translation rule for the SFC encapsulation in response to receiving the indication that the packets belonging to the flow associated with the SFC encapsulation are to bypass the SFC proxy.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
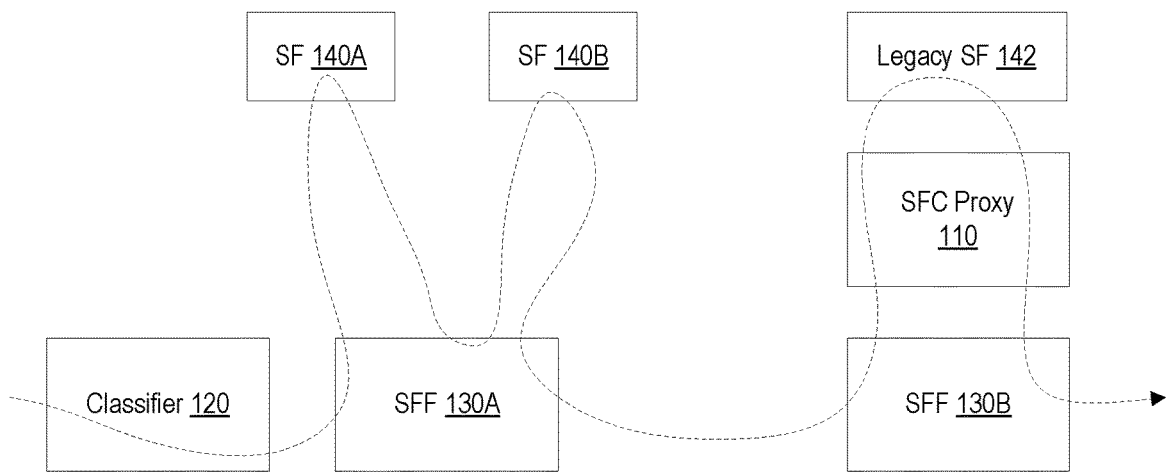
FIG. 1 is a diagram illustrating traffic flow in a network that implements service function chaining, according to some embodiments.

The following description describes methods and apparatus for bypassing a Service Function Chain (SFC) proxy. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram illustrating traffic flow in a network that implements service function chaining, according to some embodiments. The network supports the use of SFC encapsulations to realize service function chains and thus can be considered to be an SFC-enabled domain. An SFC encapsulation, as used herein, refers to an encapsulation that includes information regarding a Service Function Path (SFP) and/or an SFC. An SFP is a constrained specification of the path that a packet must traverse in order to realize an SFC. There may be multiple SFPs associated with a given SFC and these SFPs can have different levels of granularity. For example, there can be two SFPs associated with a given SFC, where the first SFP specifies the exact order of SFFs and service functions that the packet is to traverse, while the second SFP is less specific and defers to the SFFs as to the exact sequence that the packet is to traverse to realize the SFC. The SFC encapsulation may also include metadata (e.g., with data plane context information). In one embodiment, the SFC encapsulation is a Network Service Header (NSH).

As shown in the diagram, the network includes a classifier, service function forwarders (e.g., SFF 130A and SFF 130B), service functions (e.g., SF 140A, SF 140B, and legacy SF 142), and an SFC proxy 110. SF 140A and SF 140B are connected to SFF 130A. Legacy SF 142 is connected to SFF 130B via SFC proxy 110. It should be understood that the various entities in the network can be implemented by a dedicated physical network device or may be virtualized (e.g., using Network Function Virtualization (NFV)).

Classifier 120 is responsible for classifying packets based on SFC policies (e.g., n-tuple fields) and for adding the appropriate SFC encapsulation onto packets based on the classification. The SFC encapsulation added onto a packet may include an indication of a Service Function Path (SFP) that the packet is to traverse.

Each service function is a function that is responsible for specific treatment of packets. Each service function can act at various layers of a protocol stack (e.g., at the network layer or other Open Systems Interconnection (OSI) layers).

Examples of service functions include, but are not limited to, firewalls, Deep Packet Inspection (DPI), Lawful Intercept (LI), server load balancing, and Network Address Translation (NAT). A service function can be realized as a virtualized element or a non-virtualized element. One or more service functions can be embedded in the same network device and multiple occurrences of a particular service function can exist in the same administrative domain. A service function may be an SFC-aware service function or an SFC-unaware service function. An SFC-aware service function is capable of receiving and acting on information carried in an SFC encapsulation (e.g., NSH). In contrast, an SFC-unaware service function is not capable of acting on information carried in an SFC encapsulation. An SFC-unaware service function is also referred to herein as a legacy service function. In this example, SF 140A and SF 140B are SFC-aware service functions and legacy SF 142 is an SFC-unaware service function.

Each SFF 130 is responsible for forwarding packets to one or more service functions connected thereto based on the contents of the SFC encapsulation, as well as handling packets coming back from the service function. In this example, SFF 130A is connected to SF 140A and SF 140B, while SFF 130B is connected to legacy SF 142 via SFC proxy 110. SFC proxy 110 is located on a path between SFF 130B and legacy SF 142, and is responsible for removing SFC encapsulations from packets traveling to legacy SF 142 and adding SFC encapsulations onto packets returning from legacy SF 142 so that legacy SF 142 can operate in an environment where SFC encapsulations are used. For example, SFC proxy 110 may accept a packet from SFF 130B, remove the SFC encapsulation from the packet, and forward the packet to legacy SF 142 via a transport tunnel (e.g., a local attachment circuit). The SFC proxy 110 may also receive the packet back from legacy SF 142, reapply an SFC encapsulation (which may be different from the original SFC encapsulation), and return the packet to SFF 130B for further processing along an SFP.

An exemplary traffic flow in the network is shown in the diagram with a dashed line. As shown in the diagram, traffic enters the SFC-enabled domain through the classifier. The classifier classifies the traffic (e.g., based on SFC policies) and adds an SFC encapsulation onto the traffic (more specifically onto packets of the traffic) based on the classification. The SFC encapsulation may include an indication of an SFP. Subsequent forwarding of the traffic within the SFC-enabled domain is based on the contents of the SFC encapsulation. In this example, the traffic is classified as belonging to an SFP that traverses SF 140A, SF 140B, and legacy SF 142. The classifier thus forwards the traffic to SFF 130A so that the traffic can be processed by SF 140A and SF 140B. SFF 130A forwards the traffic to SF 140A and SF 140A processes the traffic and forwards the traffic back to SFF 130A. SFF 130A then forwards the traffic to SF 140B and SF 140B processes the traffic and forwards the traffic back to SFF 130A. SFF 130A then forwards the traffic to SFF 130B so that the traffic can be processed by legacy SF 142. Since legacy SF 142 is an SFC-unaware service function, SFF 130B forwards the traffic to SFC Proxy 110, which accepts traffic on behalf of legacy SF 142. SFC Proxy 110 removes the SFC encapsulation from the traffic and forwards the traffic to legacy SF 142 for processing. Legacy SF 142 processes the traffic and forwards the traffic back to SFC proxy 110. SFC proxy 110 adds an SFC encapsulation onto the traffic (which may be different from the initial SFC encapsulation for the traffic) and forwards the traffic back to SFF 130B. SFF 130B then continues with forwarding the traffic towards its destination. The SFC proxy 110 thus serves as an intermediary between SFF 130B and legacy SF 142 by translating traffic (e.g., by removing an SFC encapsulation from packets and adding back an SFC encapsulation onto the packets) so that legacy SF 142 can operate in an environment where SFC encapsulations are used.

Figure 2:
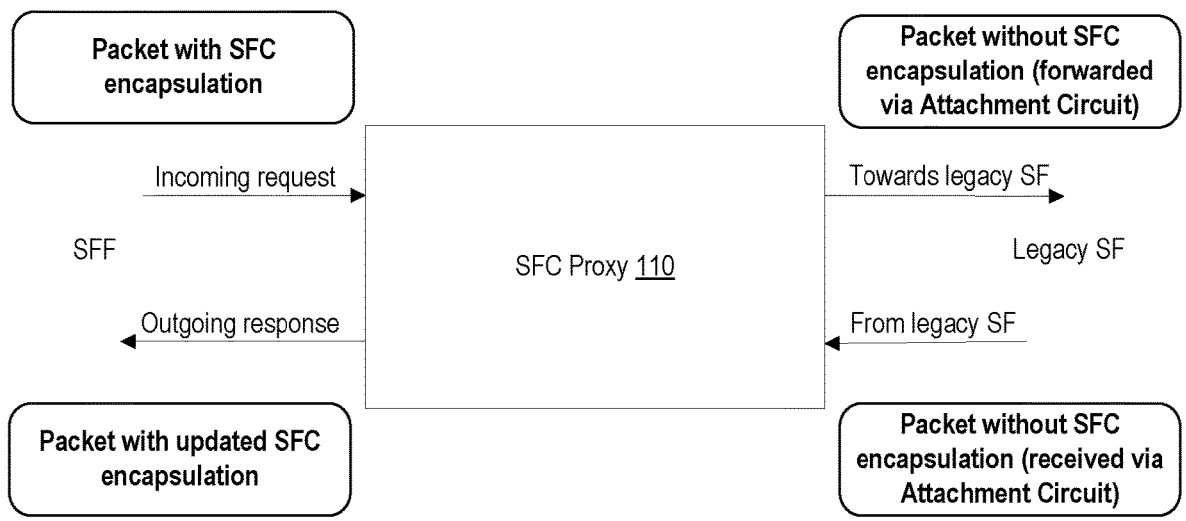
FIG. 2 is a diagram illustrating translation services provided by an SFC proxy, according to some embodiments.

FIG. 2 is a diagram illustrating translation services provided by an SFC proxy, according to some embodiments. The SFC proxy 110 accepts packets with an SFC encapsulation on behalf of a legacy service function (e.g., legacy SF 142). As shown in the diagram, the SFC proxy 110 receives, as an incoming request from an SFF 130, a packet with an SFC encapsulation. In one embodiment, the SFC encapsulation is an NSH that is added onto the packet (e.g., by a classifier). The SFC proxy 110 removes the SFC encapsulation from the packet, determines the legacy service function to be applied based on available information (e.g., based on the contents of the SFC encapsulation), and selects the appropriate local attachment circuit via which the legacy service function can be reached. The local attachment circuit may be, for example, a Virtual Local Area Network (VLAN), Internet Protocol in Internet Protocol (IP-in-IP), Layer 2 Tunneling Protocol version 3 (L2TPv3), Generic Routing Encapsulation (GRE), or a Virtual eXtensible Local Area Network (VXLAN). The SFC proxy 110 then forwards the packet without the SFC encapsulation to the legacy SF 142 via the local attachment circuit.

Subsequently, the SFC proxy 110 receives the packet back from the legacy SF 142 via the local attachment circuit (e.g., when the legacy SF 142 is finished processing the packet). The returned packet is still without SFC encapsulation. The SFC proxy 110 determines an updated SFC encapsulation that is to be added onto the packet based on available information. For example, the SFC proxy 110 may determine the appropriate updated SFC encapsulation to be added onto the packet based on the local attachment circuit through which the packet was received, based on performing packet classification (e.g., based on the contents in the packet header fields), or other local policy. In some cases, packet ordering or modification by the legacy SF 142 may necessitate additional classification in order to determine the appropriate SFC encapsulation to add onto the packet. The SFC proxy 110 then adds the updated SFC encapsulation onto the packet and forwards the packet with the updated SFC encapsulation to the SFF 130, as an outgoing response. The translation services provided by the SFC proxy 110 thus allows the SFF 130 to interact with the legacy SF 142 as if it were an SFC-aware service function. That is, from the point of view of the SFF 130, the SFC proxy 110 appears to be part of an SFC-aware service function.

Table 1, provided below, is a table that summarizes the operations of the SFC proxy 110 in both the forward and the reverse directions.

TABLE 1

| Traffic direction | Translation rules |
| --- | --- |
| Traffic from SFC proxy to legacy service function (forward direction) | 1. Pop the SFC encapsulation.<br>2. Determine appropriate local attachment circuit based on contents of the SFC encapsulation.<br>3. Forward the packet to the legacy service function via the local attachment circuit. |
| Traffic from legacy service function to SFC proxy (reverse direction) | 1. Determine updated SFC encapsulation.<br>2. Push SFC encapsulation.<br>3. Forward the packet to the SFF. |

In conventional SFC architectures, when a packet needs to be processed by a legacy service function (e.g., legacy SF 142), an SFF 130 forwards the packet to an SFC proxy 110, which removes the SFC encapsulation and forwards the (decapsulated) packet to the legacy service function 142. When the packet returns from the legacy service function 142, the SFC proxy 110 adds an updated SFC encapsulation onto the packet before forwarding the packet back to the SFF 130. Thus, the packet needs to traverse the SFC proxy 110 in both the forward and reverse directions, which adds additional latency to packets that need to be processed by a legacy service function 142.

Embodiments described herein overcome the disadvantages of conventional techniques by allowing packets to bypass the SFC proxy 110 in an SDN network. According to some embodiments, once an SFC proxy 110 determines a translation rule for an SFC encapsulation, the SFC proxy 110 provides the translation rule for the SFC encapsulation to a controller. The controller may then transmit SFC proxy bypass instructions to a switch that cause the switch to translate packets belonging to a flow associated with the SFC encapsulation according to the translation rule for the SFC encapsulation and to forward packets belonging to the flow associated with the SFC encapsulation to a service function, while bypassing the SFC proxy 110. In this way, the switch is configured to perform translations for packets belonging to the flow associated with the SFC encapsulation, which were previously being performed by the SFC proxy 110. As a result, there is no longer a need for packets belonging to the flow associated with the SFC encapsulation to be forwarded to the SFC proxy 110, and thus these packets can bypass the SFC proxy 110. Once the switch is configured according to the SFC proxy bypass instructions, the controller may transmit an indication to the SFC proxy 110 that packets belonging to the flow associated with the SFC encapsulation are to bypass the SFC proxy 110. As will be described in additional detail below, this allows the SFC proxy 110 to disable timeout processing for the translation rule for the SFC encapsulation (e.g., so that the translation rule for the SFC encapsulation is not timed out at the SFC proxy 110 while the SFC proxy 110 is being bypassed). Other embodiments are further described herein with reference to the accompanying drawings.

Figure 3:
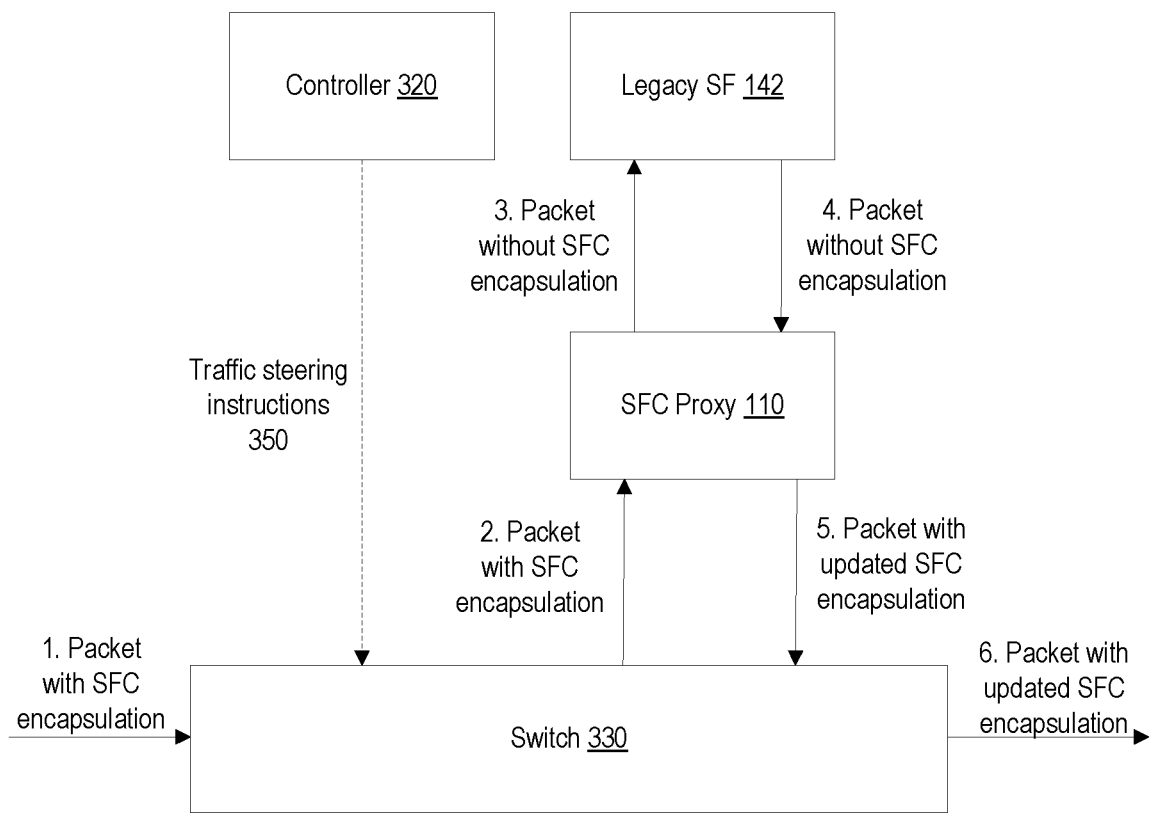
FIG. 3 is a diagram illustrating packet processing operations in a network before SFC proxy bypass is configured, according to some embodiments.

FIG. 3 is a diagram illustrating packet processing operations in a network before SFC proxy bypass is configured, according to some embodiments. The network includes a controller 320 (e.g., SDN controller), a switch 330 that is managed by the controller 320, a legacy service function (legacy SF) 142, and an SFC proxy 110. In one embodiment, the controller 320 manages the switch 330 over a southbound interface using OpenFlow or other type of southbound communications protocol. The switch 330 is communicatively coupled to legacy SF 142 via SFC proxy 110. In this example, the switch 330 functions as an SFF 130 that is connected to legacy SF 142. The SFC proxy 110 is configured to accept packets from the switch 330 on behalf of legacy SF 142.

In one embodiment, the SFC proxy 110 maintains a translation table that includes one or more translation rules. For example, the translation table maintained at the SFC proxy 110 may include a translation rule for a particular SFC encapsulation. The translation rule for a particular SFC encapsulation provides information regarding how the SFC proxy 110 is to process a packet with that particular SFC encapsulation (e.g., encapsulated with that particular SFC encapsulation). Table 2, provided below, is an exemplary translation table that includes a translation rule for an SFC encapsulation, where the SFC encapsulation is an NSH. The translation table includes two entries/rules for the translation rule (one for each direction).

TABLE 2

| Traffic direction | Identification | Attachment circuit type | Attachment circuit value | NSH operation |
| --- | --- | --- | --- | --- |
| SFC proxy to legacy service function (forward direction) | Service path ID: 10<br>Service index: 5<br>Metadata: 15 | VLAN | 10 | Pop NSH |
| Legacy service function to SFC proxy (reverse direction) | VLAN 10 | VLAN | 10 | Push NSH<br>NSH details -<br>Service path ID: 10<br>Service index: 4<br>Metadata: 15 |

The translation table includes columns for traffic direction, identification, attachment circuit type, attachment circuit value, and NSH operation. The traffic direction column is used to indicate the traffic direction. The value in this column can be 1) SFC proxy 110 to legacy service function 142 (forward direction) or 2) legacy service function 142 to SFC proxy 110 (reverse direction). For packets going in the forward direction, the identification column is used to indicate the NSH for which the entry/rule applies. For packets going in the reverse direction, the identification column is used to indicate the local attachment circuit for which the entry/rule applies. The attachment circuit type column indicates the type of attachment circuit on which to forward the packet to the service function (e.g., VLAN or VXLAN). The attachment circuit value is used to indicate the particular attachment circuit on which to forward the packet to the service function (e.g., VLAN ID). The NSH operation column is used to indicate the NSH-related action to apply to a packet. The action could be pop NSH or push NSH. In the case that the action is push NSH, the NSH operation column may also specify the contents of the NSH (e.g., service path ID, service index, and metadata).

The exemplary translation table includes a translation rule for an NSH having service path ID 10, service index 5, and metadata 15. According to the first entry/rule in the translation table, if the SFC proxy 110 receives a packet with that particular NSH from an SFF 130, the SFC proxy 110 pops (e.g., removes) the NSH and forwards the packet to the legacy service function 142 via a VLAN with VLAN ID 10. According to the second entry/rule in the translation table, when the SFC proxy 110 receives the packet back from the legacy service function 142 via the VLAN with VLAN ID 10, the SFC proxy 110 pushes an NSH having service path ID 10, service index 4, and metadata 15 onto the packet before forwarding the packet back to the SFF 130. It should be noted that the service index is decremented to indicate that the packet has been processed by the legacy service function 142. For the sake of simplicity and clarity, a translation rule for a single NSH is shown in Table 2. It should be understood, however, that the translation table can include translation rules for other NSH and other types of SFC encapsulations.

In one embodiment, the SFC proxy 110 maintains a timeout timer for translation rules in the translation table, where a translation rule for an SFC encapsulation is timed out if the SFC proxy 110 does not receive a packet with that SFC encapsulation for a period of time. When the translation rule for the SFC encapsulation is timed out, the SFC proxy 110 may release one or more resources allocated for that SFC encapsulation (e.g., a VLAN ID).

Packet processing in the network before SFC proxy bypass is configured will now be described with reference to the diagram. The switch 330 is initially configured to forward packets with an SFC encapsulation to the SFC proxy 110 (e.g., if the contents of the SFC encapsulation indicate that the packet is to be processed by legacy SF 142). For example, the controller 320 may have previously provided traffic steering instructions 350 to the switch 330 that instruct the switch 330 to forward packets with the SFC encapsulation to the SFC proxy 110. At operation 1, the switch 330 receives a packet with the SFC encapsulation. At operation 2, the switch 330 forwards the packet with the SFC encapsulation to the SFC proxy 110 (e.g., according to the previously received traffic steering instructions 350). The SFC proxy 110 removes the SFC encapsulation from the packet and at operation 3, the SFC proxy 110 forwards the packet (without the SFC encapsulation) to the legacy SF 142 (e.g., according to the translation rule for that SFC encapsulation). The legacy SF 142 processes the packet and at operation 4, forwards the packet (still without the SFC encapsulation) back to the SFC proxy 110. The SFC proxy 110 adds an updated SFC encapsulation onto the packet (e.g., according to the translation rule for that SFC encapsulation) and at operation 5, forwards the packet with the updated SFC encapsulation to the switch 330. The switch 330 then continues forwarding the packet with the updated SFC encapsulation along the appropriate SFP.

Figure 4:
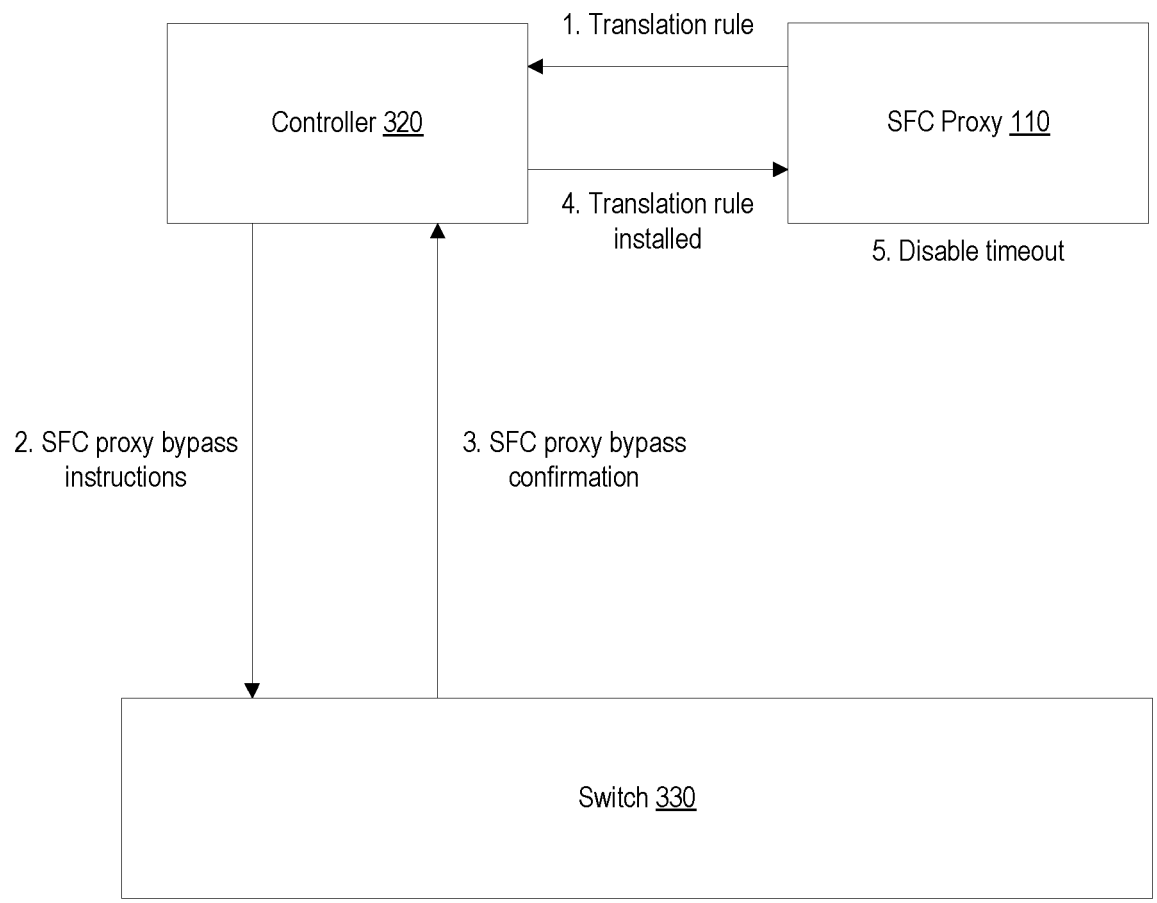
FIG. 4 is a diagram illustrating operations for configuring SFC proxy bypass in a network, according to some embodiments.

FIG. 4 is a diagram illustrating operations for configuring SFC proxy bypass in a network, according to some embodiments. At operation 1, once the SFC proxy 110 determines the translation rule for an SFC encapsulation (e.g., the translation rule described with reference to Table 2), the SFC proxy 110 provides the translation rule for the SFC encapsulation to the controller 320. At operation 2, the controller 320 instructs the switch 330 to translate packets belonging to the flow associated with the SFC encapsulation according to the translation rule for the SFC encapsulation (e.g., remove SFC encapsulation in the forward direction and add an updated SFC encapsulation in the reverse direction) and to forward packets belonging to the flow associated with the SFC encapsulation to the legacy SF 142 while bypassing the SFC proxy 110 (designated as "SFC proxy bypass instructions"). The switch 330 may then be configured to perform packet processing according to the SFC proxy bypass instructions (e.g., by generating flow entries to carry out the SFC proxy bypass instructions). As used herein, a flow associated with an SFC encapsulation is a set of packets with that SFC encapsulation (and may also include these same packets after they have been decapsulated—e.g., when they are forwarded to and from a legacy service function 142). At operation 3, the switch 330 transmits an indication to the controller 320 that SFC proxy bypass for the SFC encapsulation has been configured (designated as "SFC proxy bypass confirmation"). At operation 4, the controller 320 transmits an indication to the SFC proxy 110 that SFC proxy bypass for the SFC encapsulation has been configured (e.g., packets belonging to the flow associated with the SFC encapsulation are to bypass the SFC proxy 110) (designated as "translation rule installed"). At operation 5, the SFC proxy 110 disables timeout processing for the translation rule for the SFC encapsulation. As mentioned above, the SFC proxy 110 may release one or more resources allocated for an SFC encapsulation (e.g., a VLAN ID) if the translation rule for that SFC encapsulation times out. Disabling timeout processing for the translation rule prevents the translation rule from timing out prematurely while the SFC proxy 110 is being bypassed.

In one embodiment, SFC proxy bypass can be selectively configured for certain SFC encapsulations. For example, SFC proxy bypass may be configured for an SFC encapsulation if the flow associated with that SFC encapsulation is an elephant flow (or is expected to be an elephant flow). Elephant flows are large flows with long durations (what is considered a large flow and a long duration can be defined by a network operator or other entity). In one embodiment, the SFC proxy 110 transmits an indication of the approximate size and duration of the flow associated with the SFC encapsulation to the controller 320. For example, the SFC proxy 110 may transmit an indication of whether the flow associated with the SFC encapsulation is an elephant flow or not. Based on this indication, the controller 320 can determine whether the flow should bypass the SFC proxy 110 or not.

Figure 5:
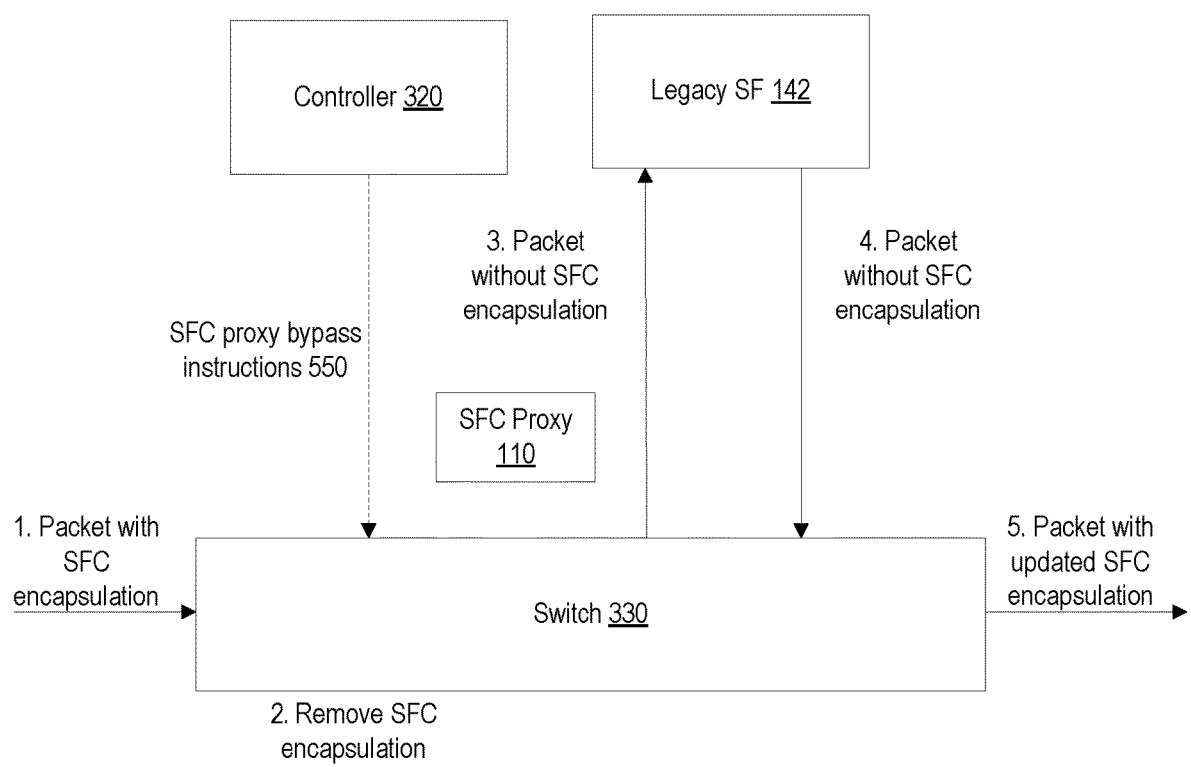
FIG. 5 is a diagram illustrating packet processing operations in a network after SFC proxy bypass has been configured, according to some embodiments.

FIG. 5 is a diagram illustrating packet processing operations in a network after SFC proxy bypass has been configured, according to some embodiments. The switch 330 may have been previously configured to translate packets belonging to the flow associated with the SFC encapsulation and to forward packets belonging to the flow associated with the SFC encapsulation to the legacy SF 142 while bypassing the SFC proxy 110 (e.g., based on receiving SFC proxy bypass instructions 550). At operation 1, the switch 330 receives a packet with the SFC encapsulation. At operation 2, the switch 330 removes the SFC encapsulation. At operation 3, the switch 330 forwards the packet (without the SFC encapsulation) to the legacy SF 142 while bypassing the SFC proxy 110. The legacy SF 142 processes the packet and at operation 4, forwards the packet (still without the SFC encapsulation) back to the switch 330. The switch 330 adds an updated SFC encapsulation onto the packet and at operation 5, continues forwarding the packet with the updated SFC encapsulation along the appropriate SFP. As a result, the packet bypasses the SFC proxy 110, thereby avoiding the latency/bandwidth that is introduced by conventional techniques that require the packet to traverse the SFC proxy 110.

Figure 6:
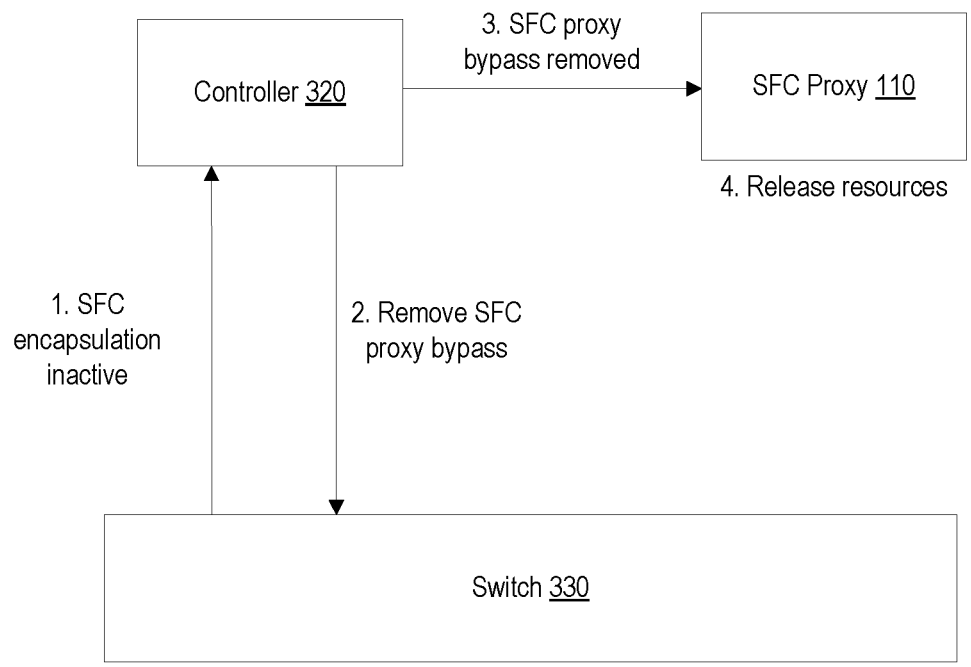
FIG. 6 is a diagram illustrating operations for handling termination of a flow associated with an SFC encapsulation, according to some embodiments.

FIG. 6 is a diagram illustrating operations for handling termination of a flow associated with an SFC encapsulation, according to some embodiments. At operation 1, the switch 330 transmits an indication to the controller 320 that the flow associated with the SFC encapsulation is inactive. The switch 330 may have determined that the flow is inactive based on a determination that the flow entry for the flow has timed out. In response, at operation 2, the controller 320 instructs the switch 330 to remove or undo configurations related to the SFC proxy bypass for the SFC encapsulation (designated as "remove SFC proxy bypass"). At operation 3, the controller 320 transmits an indication to the SFC proxy 110 that SFC proxy bypass for the SFC encapsulation has been removed (designated as "SFC proxy bypass removed"). In response, at operation 4, the SFC proxy 110 releases one or more resources allocated for the SFC encapsulation (e.g., a VLAN ID).

Figure 7:
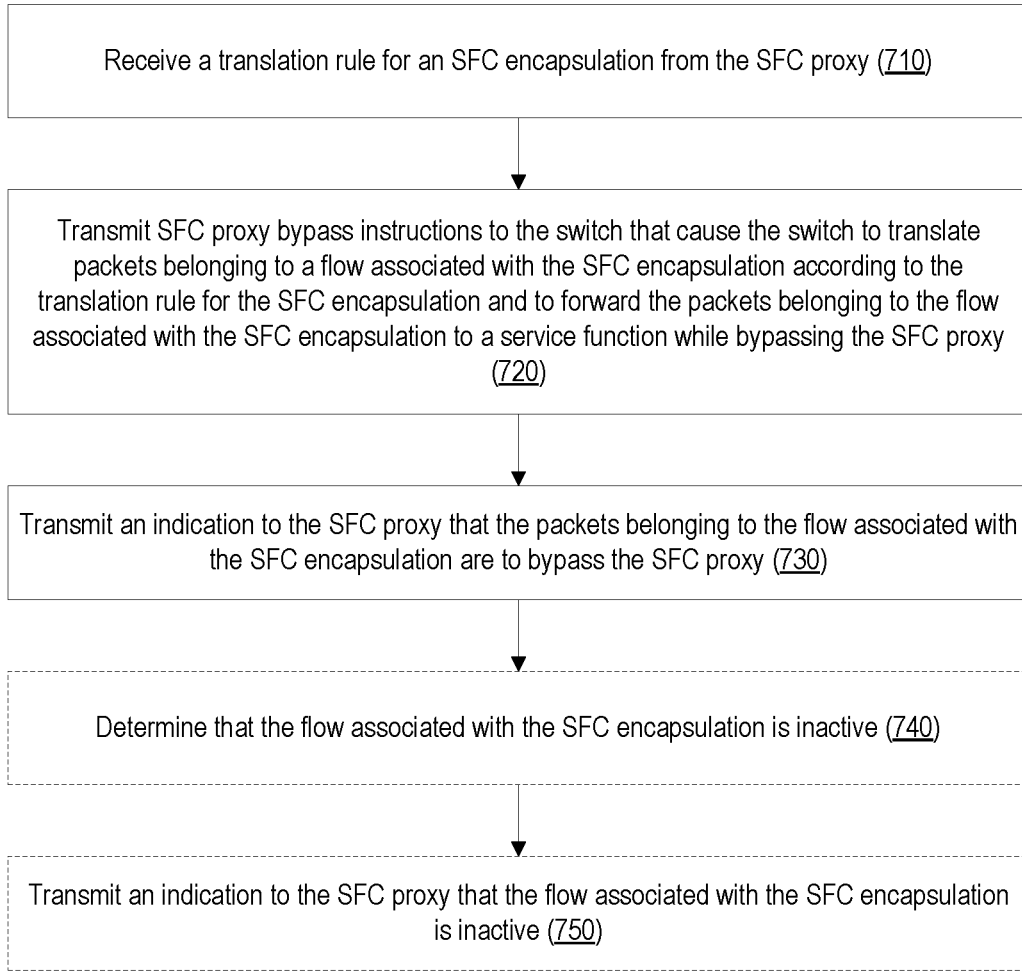
FIG. 7 is a flow diagram of a process for configuring a switch in an SDN network to process packets on behalf of an SFC proxy so that the packets can bypass the SFC proxy, according to some embodiments.

FIG. 7 is a flow diagram of a process for configuring a switch in an SDN network to process packets on behalf of an SFC proxy so that the packets can bypass the SFC proxy, according to some embodiments. In one embodiment, the process is performed by a network device functioning as a controller 320 in the SDN network, where the controller 320 manages a switch 330 in the SDN network. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the controller 320 receives a translation rule for an SFC encapsulation from the SFC proxy 110 (block 710). In one embodiment, the controller 320 also receives an indication of an approximate size and duration of the flow associated with the SFC encapsulation (e.g., whether the flow is an elephant flow) from the SFC proxy 110 or other entity. The controller 320 may use this information to determine whether the flow associated with the SFC encapsulation is to bypass the SFC proxy 110 or not. For example, the controller 320 may decide that only flows that have an approximate size and/or duration that exceed a predetermined threshold should bypass the SFC proxy 110. The controller 320 may perform the remaining operations of the flow diagram for such flows so that those flows bypass the SFC proxy 110. In one embodiment, the translation rule for the SFC encapsulation includes a first rule for packets traveling from the SFC proxy 110 to the service function (forward direction) and a second rule for packets traveling from the service function to the SFC proxy 110 (reverse direction). In one embodiment, the first rule (for the forward direction) includes an indication of one or more attributes that identify the SFC encapsulation, an indication of an attachment circuit associated with the SFC encapsulation (the attachment circuit on which to forward packets to the service function and on which to receive the packets back from the service function), and an indication to remove (e.g., pop) the SFC encapsulation. In one embodiment, the second rule (for the reverse direction) includes an indication of an attachment circuit associated with the SFC encapsulation and an indication to add (e.g., push) an updated SFC encapsulation (onto packets received via the attachment circuit associated with the SFC encapsulation). The attachment circuit may be, for example, a VLAN, IP-in-IP, L2TPv3, GRE, or a VXLAN. In one embodiment, the SFC encapsulation is a Network Service Header (NSH) that includes a service path identifier (ID) and a service index. In one embodiment, the NSH also includes metadata (e.g., with data plane context information).

In response to receiving the translation rule for the SFC encapsulation, the controller 320 transmits SFC proxy bypass instructions to the switch 330 that cause the switch 330 to translate packets belonging to a flow associated with the SFC encapsulation according to the translation rule for the SFC encapsulation (e.g., remove and add SFC encapsulations) and to forward packets belonging to the flow associated with the SFC encapsulation to a service function while bypassing the SFC proxy 110 (block 720). In one embodiment, the SFC proxy bypass instructions cause the switch 330 to translate the packets belonging to the flow associated with the SFC encapsulation by causing the switch 330 to remove the SFC encapsulation from packets encapsulated with the SFC encapsulation before forwarding the packets to the service function. In one embodiment, the SFC proxy bypass instructions cause the switch 330 to translate the packets belonging to the flow associated with the SFC encapsulation by causing the switch 330 to add an updated SFC encapsulation onto packets returning from the service function (e.g., via an attachment circuit associated with the SFC encapsulation). In one embodiment, the SFC proxy bypass instructions cause the switch 330 to forward the packets belonging to the flow associated with the SFC encapsulation to the service function by causing the switch 330 to forward the packets belonging to the flow associated with the SFC encapsulation on an attachment circuit associated with the SFC encapsulation. In one embodiment, the attachment circuit is a VLAN circuit. In one embodiment, the SFC proxy bypass instructions include instructions to generate one or more flow entries (or remove one or more flow entries) that cause the switch to perform the SFC proxy bypass (e.g., translation and forwarding of packets).

The controller 320 then transmits an indication to the SFC proxy 110 that packets belonging to the flow associated with the SFC encapsulation are to bypass the SFC proxy 110 (block 740). This allows the SFC proxy 110 to disable timeout processing for the translation rule for the SFC encapsulation while the SFC proxy 110 is being bypassed.

In some embodiments, the controller 320 may subsequently determine that the flow associated with the SFC encapsulation is inactive (block 750). In one embodiment, the determination that the flow is inactive is based on receiving an indication from the switch 330 that the flow is inactive. In one embodiment, the controller 320 may transmit an instruction to the switch 330 that causes the switch 330 to transmit an indication to the controller 320 that the flow is inactive when the switch 330 determines that the flow is inactive. In response to determining that the flow is inactive, the controller 320 transmits an indication to the SFC proxy 110 that the flow is inactive (block 760). This allows the SFC proxy 110 to release one or more resources allocated for the SFC encapsulation (e.g., a VLAN ID).

Figure 8:
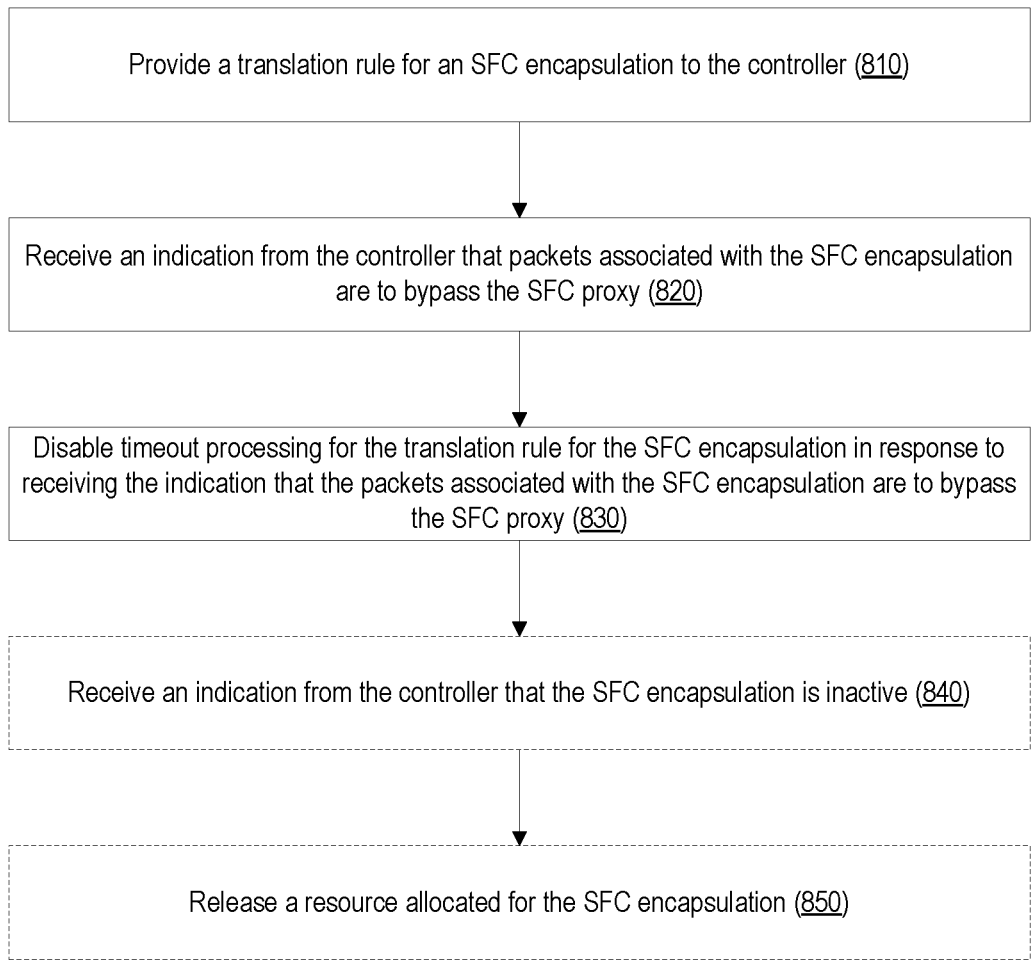
FIG. 8 is a flow diagram of a process for causing packets in an SDN network to bypass an SFC proxy, according to some embodiments.

FIG. 8 is a flow diagram of a process for causing packets in an SDN network to bypass an SFC proxy, according to some embodiments. In one embodiment, the process is performed by a network device functioning as an SFC proxy 110 that is communicatively coupled to a controller 320 in the SDN network.

In one embodiment, the process is initiated when the SFC proxy 110 provides a translation rule for an SFC encapsulation to the controller 320 (block 810). In one embodiment, the SFC proxy 110 provides the translation rule for the SFC encapsulation to the controller 320 by transmitting the translation rule for the SFC encapsulation directly to the controller 320. In another embodiment, the SFC proxy 110 provides the translation rule for the SFC encapsulation to the controller 320 by storing/publishing the translation rule for the SFC encapsulation at a location that the controller 320 can access. The controller 320 may then retrieve/pull the translation rule for the SFC encapsulation from that location (e.g., the location could be at the SFC proxy 110 itself or at a separate database/server). The SFC proxy 110 may subsequently receive an indication from the controller 320 that the packets belonging to the flow associated with the SFC encapsulation are to bypass the SFC proxy 110 (e.g., if the controller 320 confirms that SFC proxy bypass is successfully configured in the SDN network) (block 820). In response, the SFC proxy 110 disables timeout processing for the translation rule for the SFC encapsulation (block 830).

Subsequently, the SFC proxy 110 may receive an indication from the controller 320 that the flow associated with the SFC encapsulation is inactive (block 840). In response, the SFC proxy 110 may release a resource allocated for the SFC encapsulation (block 850). In one embodiment, the resource allocated for the SFC encapsulation that is released is a VLAN ID allocated for the SFC encapsulation.

Figure 9:
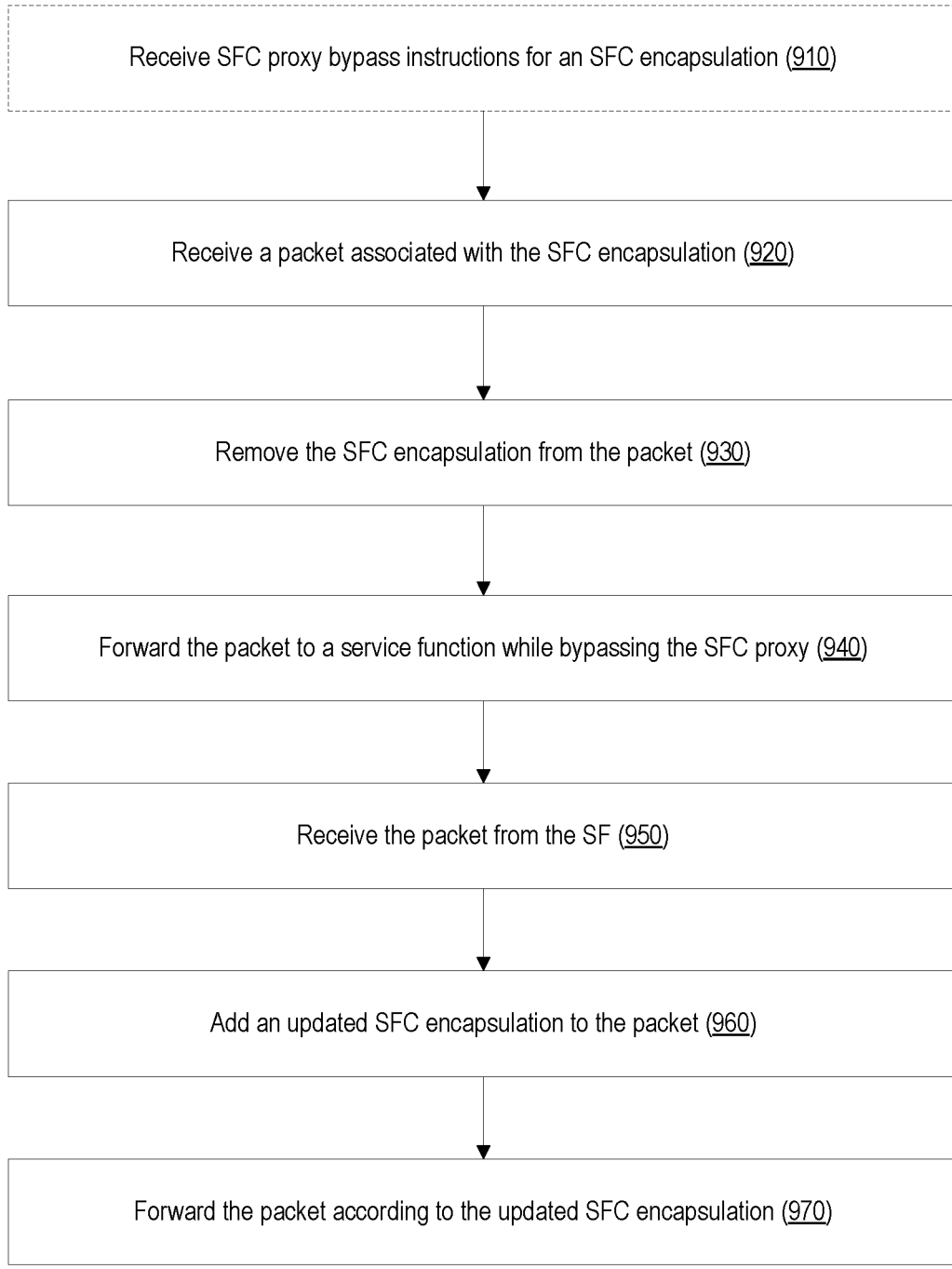
FIG. 9 is a flow diagram of a process for processing packets on behalf of an SFC proxy so that the packets can bypass the SFC proxy, according to some embodiments.

FIG. 9 is a flow diagram of a process for processing packets on behalf of an SFC proxy so that the packets can bypass the SFC proxy, according to some embodiments. In one embodiment, the process is performed by a network device functioning as a switch 330 in an SDN network.

In one embodiment, the process is initiated when switch 330 receives (e.g., from a controller 320) SFC proxy bypass instructions for an SFC encapsulation (block 910). The SFC proxy bypass instructions may instruct the switch 330 to translate packets belonging to a flow associated with the SFC encapsulation (e.g., remove and add SFC encapsulations) and to forward packets belonging to the flow associated with the SFC encapsulation to a service function while bypassing the SFC proxy 110.

When the switch 330 receives a packet belonging to a flow associated with the SFC encapsulation (block 920), the switch 330 removes the SFC encapsulation from the packet (block 930) and forwards the packet to a service function while bypassing the SFC proxy 110 (block 940) (e.g., according to the SFC proxy bypass instructions).

Subsequently, the switch 330 receives the packet back from the service function (block 950). The switch 330 then adds an updated SFC encapsulation onto the packet (block 960) and forwards the packet according to the updated SFC encapsulation (block 970) (e.g., according to the SFC proxy bypass instructions).

Embodiments described herein thus allow packets to bypass an SFC proxy 110. An advantage provided by the embodiments described herein is that the latency of packets that need to be processed by a legacy service function 142 is reduced. Yet another advantage of embodiments described herein is that east-west communication in a datacenter is reduced since packets do not need to be forwarded to an SFC proxy 110. These advantages are even more pronounced when SFC proxy bypass is provided for elephant flows (e.g., large flows with long durations). Other advantages will be readily apparent based on the descriptions provided herein.

Figure 10A:
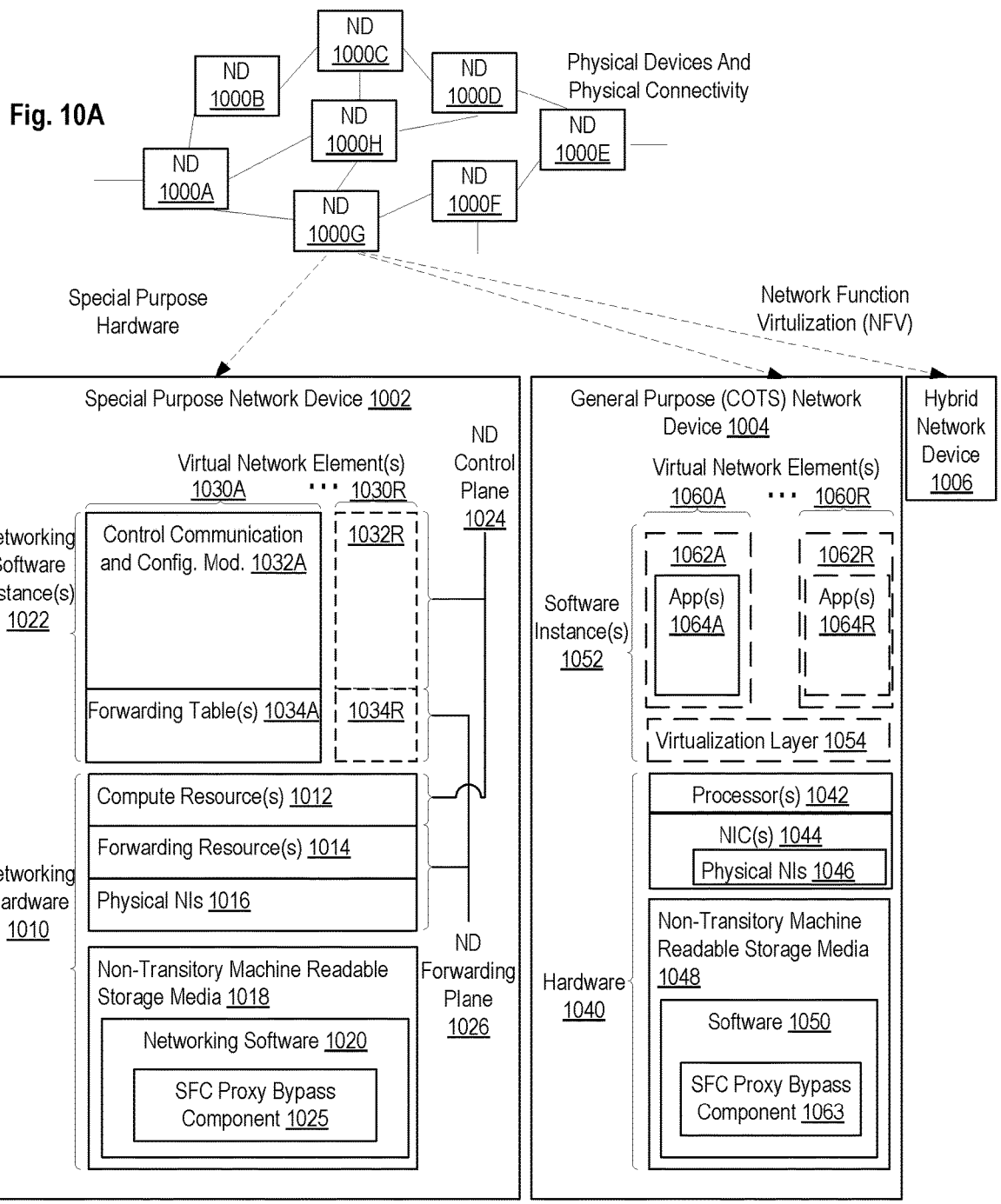
FIG. 10A illustrates connectivity between network devices (NDs) within an exemplary network, as well as three exemplary implementations of the NDs, according to some embodiments.

FIG. 10A illustrates connectivity between network devices (NDs) within an exemplary network, as well as three exemplary implementations of the NDs, according to some embodiments of the invention. FIG. 10A shows NDs 1000A-H, and their connectivity by way of lines between 1000A-1000B, 1000B-1000C, 1000C-1000D, 1000D-1000E, 1000E-1000F, 1000F-1000G, and 1000A-1000G, as well as between 1000H and each of 1000A, 1000C, 1000D, and 1000G. These NDs are physical devices, and the connectivity between these NDs can be wireless or wired (often referred to as a link). An additional line extending from NDs 1000A, 1000E, and 1000F illustrates that these NDs act as ingress and egress points for the network (and thus, these NDs are sometimes referred to as edge NDs; while the other NDs may be called core NDs).

Two of the exemplary ND implementations in FIG. 10A are: 1) a special-purpose network device 1002 that uses custom application-specific integrated-circuits (ASICs) and a special-purpose operating system (OS); and 2) a general purpose network device 1004 that uses common off-the-shelf (COTS) processors and a standard OS.

The special-purpose network device 1002 includes networking hardware 1010 comprising compute resource(s) 1012 (which typically include a set of one or more processors), forwarding resource(s) 1014 (which typically include one or more ASICs and/or network processors), and physical network interfaces (NIs) 1016 (sometimes called physical ports), as well as non-transitory machine readable storage media 1018 having stored therein networking software 1020. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1000A-H. During operation, the networking software 1020 may be executed by the networking hardware 1010 to instantiate a set of one or more networking software instance(s) 1022. Each of the networking software instance(s) 1022, and that part of the networking hardware 1010 that executes that network software instance (be it hardware dedicated to that networking software instance and/or time slices of hardware temporally shared by that networking software instance with others of the networking software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R, such that a given virtual network element (e.g., 1030A) includes the control communication and configuration module (e.g., 1032A), a set of one or more forwarding table(s) (e.g., 1034A), and that portion of the networking hardware 1010 that executes the virtual network element (e.g., 1030A).

Software 1020 can include code such as SFC proxy bypass component 1025, which when executed by networking hardware 1010, causes the special-purpose network device 1002 to perform operations of one or more embodiments of the present invention as part networking software instances 1022.

The special-purpose network device 1002 is often physically and/or logically considered to include: 1) a ND control plane 1024 (sometimes referred to as a control plane) comprising the compute resource(s) 1012 that execute the control communication and configuration module(s) 1032A-R; and 2) a ND forwarding plane 1026 (sometimes referred to as a forwarding plane, a data plane, or a media plane) comprising the forwarding resource(s) 1014 that utilize the forwarding table(s) 1034A-R and the physical NIs 1016. By way of example, where the ND is a router (or is implementing routing functionality), the ND control plane 1024 (the compute resource(s) 1012 executing the control communication and configuration module(s) 1032A-R) is typically responsible for participating in controlling how data (e.g., packets) is to be routed (e.g., the next hop for the data and the outgoing physical NI for that data) and storing that routing information in the forwarding table(s) 1034A-R, and the ND forwarding plane 1026 is responsible for receiving that data on the physical NIs 1016 and forwarding that data out the appropriate ones of the physical NIs 1016 based on the forwarding table(s) 1034A-R.

Figure 10B:
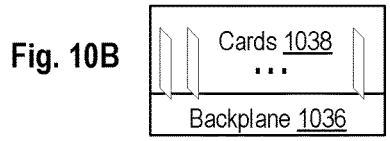
FIG. 10B illustrates an exemplary way to implement a special-purpose network device, according to some embodiments.

FIG. 10B illustrates an exemplary way to implement the special-purpose network device 1002 according to some embodiments of the invention. FIG. 10B shows a special-purpose network device including cards 1038 (typically hot pluggable). While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general purpose network device 1004 includes hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein software 1050. During operation, the processor(s) 1042 execute the software 1050 to instantiate one or more sets of one or more applications 1064A-R. While one embodiment does not implement virtualization, alternative embodiments may use different forms of virtualization. For example, in one such alternative embodiment the virtualization layer 1054 represents the kernel of an operating system (or a shim executing on a base operating system) that allows for the creation of multiple instances 1062A-R called software containers that may each be used to execute one (or more) of the sets of applications 1064A-R; where the multiple software containers (also called virtualization engines, virtual private servers, or jails) are user spaces (typically a virtual memory space) that are separate from each other and separate from the kernel space in which the operating system is run; and where the set of applications running in a given user space; unless explicitly allowed, cannot access the memory of the other processes. In another such alternative embodiment the virtualization layer 1054 represents a hypervisor (sometimes referred to as a virtual machine monitor (VMM)) or a hypervisor executing on top of a host operating system, and each of the sets of applications 1064A-R is run on top of a guest operating system within an instance 1062A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1040, directly on a hypervisor (in which case the unikernel is sometimes described as running within a LibOS virtual machine), or in a software container, embodiments can be implemented fully with unikernels running directly on a hypervisor represented by virtualization layer 1054, unikernels running within software containers represented by instances 1062A-R, or as a combination of unikernels and the above-described techniques (e.g., unikernels and virtual machines both run directly on a hypervisor, unikernels and sets of applications that are run in different software containers).

The instantiation of the one or more sets of one or more applications 1064A-R, as well as virtualization if implemented, are collectively referred to as software instance(s) 1052. Each set of applications 1064A-R, corresponding virtualization construct (e.g., instance 1062A-R) if implemented, and that part of the hardware 1040 that executes them (be it hardware dedicated to that execution and/or time slices of hardware temporally shared), forms a separate virtual network element(s) 1060A-R.

The virtual network element(s) 1060A-R perform similar functionality to the virtual network element(s) 1030A-R—e.g., similar to the control communication and configuration module(s) 1032A and forwarding table(s) 1034A (this virtualization of the hardware 1040 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1062A-R corresponding to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1062A-R to VNEs also apply to embodiments where such a finer level of granularity and/or unikernels are used.

In certain embodiments, the virtualization layer 1054 includes a virtual switch that provides similar forwarding services as a physical Ethernet switch. Specifically, this virtual switch forwards traffic between instances 1062A-R and the NIC(s) 1044, as well as optionally between the instances 1062A-R; in addition, this virtual switch may enforce network isolation between the VNEs 1060A-R that by policy are not permitted to communicate with each other (e.g., by honoring virtual local area networks (VLANs)).

Software 1050 can include code such as SFC proxy bypass component 1063, which when executed by processor(s) 1042, cause the general purpose network device 1004 to perform operations of one or more embodiments of the present invention as part software instances 1062A-R.

The third exemplary ND implementation in FIG. 10A is a hybrid network device 1006, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1002) could provide for para-virtualization to the networking hardware present in the hybrid network device 1006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 10C:
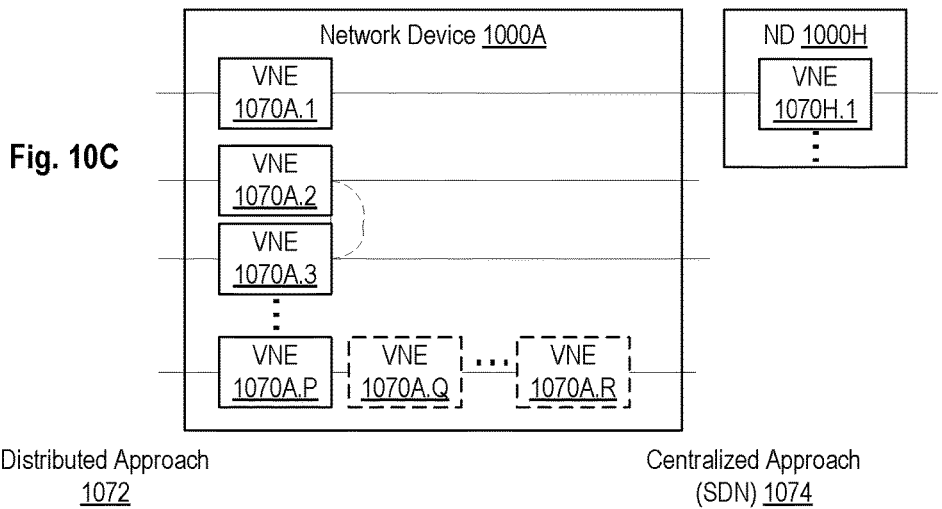
FIG. 10C illustrates various exemplary ways in which virtual network elements (VNEs) may be coupled, according to some embodiments.

FIG. 10C illustrates various exemplary ways in which VNEs may be coupled according to some embodiments of the invention. FIG. 10C shows VNEs 1070A.1-1070A.P (and optionally VNEs 1070A.Q-1070A.R) implemented in ND 1000A and VNE 1070H.1 in ND 1000H. In FIG. 10C, VNEs 1070A.1-P are separate from each other in the sense that they can receive packets from outside ND 1000A and forward packets outside of ND 1000A; VNE 1070A.1 is coupled with VNE 1070H.1, and thus they communicate packets between their respective NDs; VNE 1070A.2-1070A.3 may optionally forward packets between themselves without forwarding them outside of the ND 1000A; and VNE 1070A.P may optionally be the first in a chain of VNEs that includes VNE 1070A.Q followed by VNE 1070A.R (this is sometimes referred to as dynamic service chaining, where each of the VNEs in the series of VNEs provides a different service—e.g., one or more layer 4-7 network services). While FIG. 10C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 10A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 10A may also host one or more such servers (e.g., in the case of the general purpose network device 1004, one or more of the software instances 1062A-R may operate as servers; the same would be true for the hybrid network device 1006; in the case of the special-purpose network device 1002, one or more such servers could also be run on a virtualization layer executed by the compute resource(s) 1012); in which case the servers are said to be co-located with the VNEs of that ND.

A virtual network is a logical abstraction of a physical network (such as that in FIG. 10A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 10D:
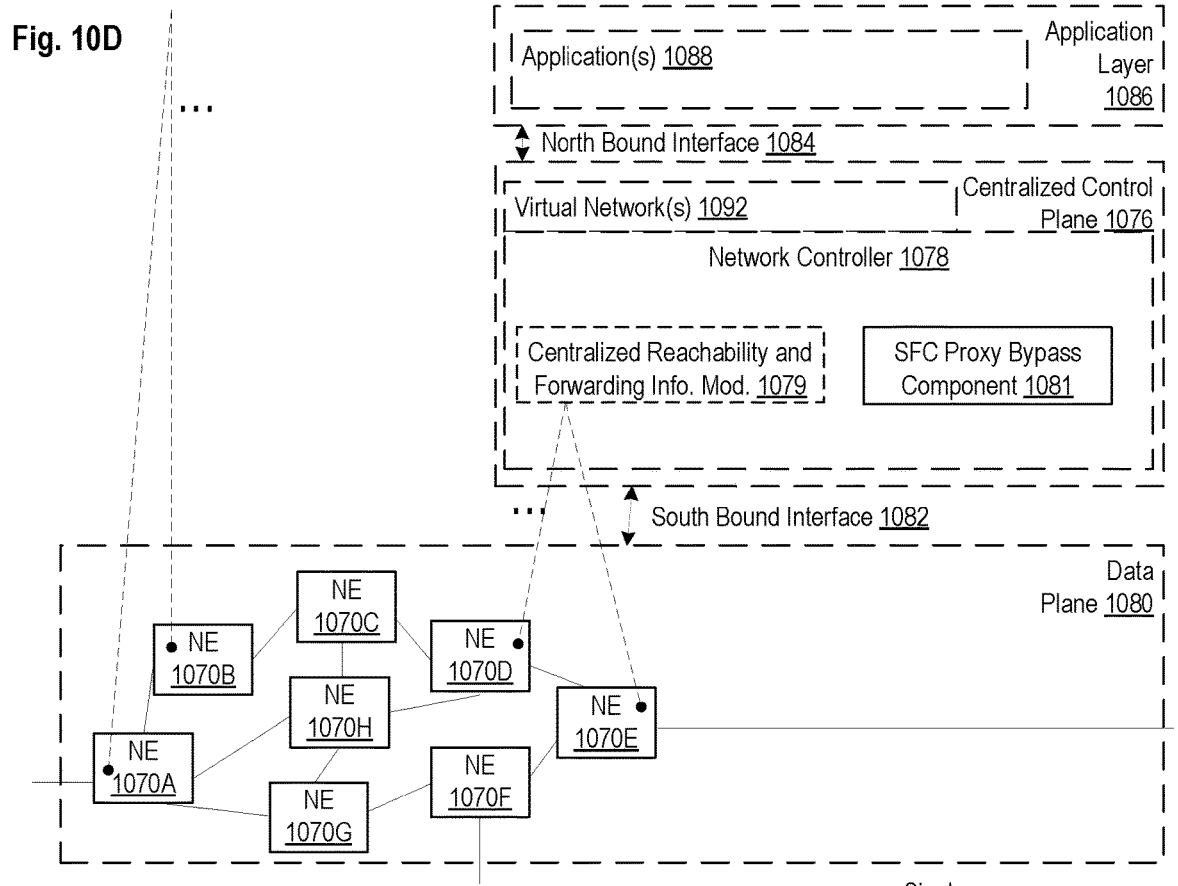
FIG. 10D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 10D illustrates a network with a single network element on each of the NDs of FIG. 10A, and within this straight forward approach contrasts a traditional distributed approach (commonly used by traditional routers) with a centralized approach for maintaining reachability and forwarding information (also called network control), according to some embodiments of the invention. Specifically, FIG. 10D illustrates network elements (NEs) 1070A-H with the same connectivity as the NDs 1000A-H of FIG. 10A.

FIG. 10D illustrates that the distributed approach 1072 distributes responsibility for generating the reachability and forwarding information across the NEs 1070A-H; in other words, the process of neighbor discovery and topology discovery is distributed.

For example, where the special-purpose network device 1002 is used, the control communication and configuration module(s) 1032A-R of the ND control plane 1024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1070A-H (e.g., the compute resource(s) 1012 executing the control communication and configuration module(s) 1032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1024. The ND control plane 1024 programs the ND forwarding plane 1026 with information (e.g., adjacency and route information) based on the routing structure(s). For example, the ND control plane 1024 programs the adjacency and route information into one or more forwarding table(s) 1034A-R (e.g., Forwarding Information Base (FIB), Label Forwarding Information Base (LFIB), and one or more adjacency structures) on the ND forwarding plane 1026. For layer 2 forwarding, the ND can store one or more bridging tables that are used to forward data based on the layer 2 information in that data. While the above example uses the special-purpose network device 1002, the same distributed approach 1072 can be implemented on the general purpose network device 1004 and the hybrid network device 1006.

FIG. 10D illustrates that a centralized approach 1074 (also known as software defined networking (SDN)) that decouples the system that makes decisions about where traffic is sent from the underlying systems that forwards traffic to the selected destination. The illustrated centralized approach 1074 has the responsibility for the generation of reachability and forwarding information in a centralized control plane 1076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1076 has a south bound interface 1082 with a data plane 1080 (sometime referred to the infrastructure layer, network forwarding plane, or forwarding plane (which should not be confused with a ND forwarding plane)) that includes the NEs 1070A-H (sometimes referred to as switches, forwarding elements, data plane elements, or nodes). The centralized control plane 1076 includes a network controller 1078, which includes a centralized reachability and forwarding information module 1079 that determines the reachability within the network and distributes the forwarding information to the NEs 1070A-H of the data plane 1080 over the south bound interface 1082 (which may use the OpenFlow protocol). Thus, the network intelligence is centralized in the centralized control plane 1076 executing on electronic devices that are typically separate from the NDs. In one embodiment, the network controller 1078 may include a SFC proxy bypass component 1081 that when executed by the network controller 1078, causes the network controller 1078 to perform operations of one or more embodiments described herein above.

For example, where the special-purpose network device 1002 is used in the data plane 1080, each of the control communication and configuration module(s) 1032A-R of the ND control plane 1024 typically include a control agent that provides the VNE side of the south bound interface 1082. In this case, the ND control plane 1024 (the compute resource(s) 1012 executing the control communication and configuration module(s) 1032A-R) performs its responsibility for participating in controlling how data (e.g., packets) is to be routed (e.g., the next hop for the data and the outgoing physical NI for that data) through the control agent communicating with the centralized control plane 1076 to receive the forwarding information (and in some cases, the reachability information) from the centralized reachability and forwarding information module 1079 (it should be understood that in some embodiments of the invention, the control communication and configuration module(s) 1032A-R, in addition to communicating with the centralized control plane 1076, may also play some role in determining reachability and/or calculating forwarding information—albeit less so than in the case of a distributed approach; such embodiments are generally considered to fall under the centralized approach 1074, but may also be considered a hybrid approach).

While the above example uses the special-purpose network device 1002, the same centralized approach 1074 can be implemented with the general purpose network device 1004 (e.g., each of the VNE 1060A-R performs its responsibility for controlling how data (e.g., packets) is to be routed (e.g., the next hop for the data and the outgoing physical NI for that data) by communicating with the centralized control plane 1076 to receive the forwarding information (and in some cases, the reachability information) from the centralized reachability and forwarding information module 1079; it should be understood that in some embodiments of the invention, the VNEs 1060A-R, in addition to communicating with the centralized control plane 1076, may also play some role in determining reachability and/or calculating forwarding information—albeit less so than in the case of a distributed approach) and the hybrid network device 1006. In fact, the use of SDN techniques can enhance the NFV techniques typically used in the general purpose network device 1004 or hybrid network device 1006 implementations as NFV is able to support SDN by providing an infrastructure upon which the SDN software can be run, and NFV and SDN both aim to make use of commodity server hardware and physical switches.

FIG. 10D also shows that the centralized control plane 1076 has a north bound interface 1084 to an application layer 1086, in which resides application(s) 1088. The centralized control plane 1076 has the ability to form virtual networks 1092 (sometimes referred to as a logical forwarding plane, network services, or overlay networks (with the NEs 1070A-H of the data plane 1080 being the underlay network)) for the application(s) 1088. Thus, the centralized control plane 1076 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 10D shows the distributed approach 1072 separate from the centralized approach 1074, the effort of network control may be distributed differently or the two combined in certain embodiments of the invention. For example: 1) embodiments may generally use the centralized approach (SDN) 1074, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1074, but may also be considered a hybrid approach.

While FIG. 10D illustrates the simple case where each of the NDs 1000A-H implements a single NE 1070A-H, it should be understood that the network control approaches described with reference to FIG. 10D also work for networks where one or more of the NDs 1000A-H implement multiple VNEs (e.g., VNEs 1030A-R, VNEs 1060A-R, those in the hybrid network device 1006). Alternatively or in addition, the network controller 1078 may also emulate the implementation of multiple VNEs in a single ND. Specifically, instead of (or in addition to) implementing multiple VNEs in a single ND, the network controller 1078 may present the implementation of a VNE/NE in a single ND as multiple VNEs in the virtual networks 1092 (all in the same one of the virtual network(s) 1092, each in different ones of the virtual network(s) 1092, or some combination). For example, the network controller 1078 may cause an ND to implement a single VNE (a NE) in the underlay network, and then logically divide up the resources of that NE within the centralized control plane 1076 to present different VNEs in the virtual network(s) 1092 (where these different VNEs in the overlay networks are sharing the resources of the single VNE/NE implementation on the ND in the underlay network).

Figure 10E:
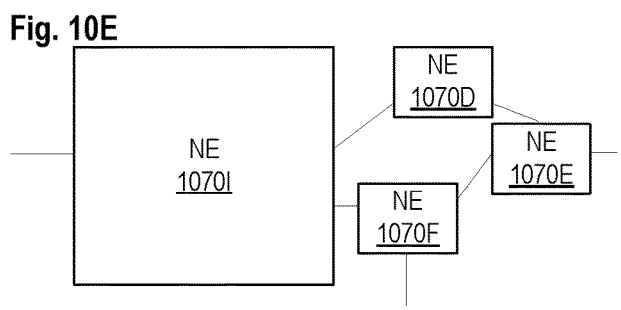
FIG. 10E illustrates the simple case of where each of the NDs implements a single NE, but a centralized control plane has abstracted multiple of the NEs in different NDs into (to represent) a single NE in one of the virtual network(s), according to some embodiments.
Figure 10F:
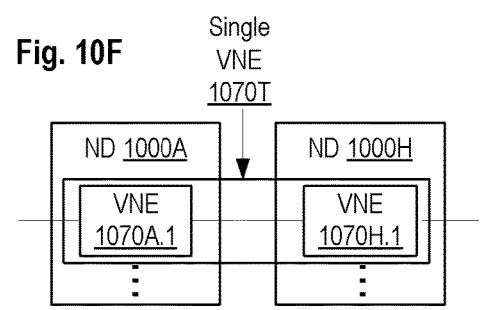
FIG. 10F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 10E and 10F respectively illustrate exemplary abstractions of NEs and VNEs that the network controller 1078 may present as part of different ones of the virtual networks 1092. FIG. 10E illustrates the simple case of where each of the NDs 1000A-H implements a single NE 1070A-H (see FIG. 10D), but the centralized control plane 1076 has abstracted multiple of the NEs in different NDs (the NEs 1070A-C and G-H) into (to represent) a single NE 1070I in one of the virtual network(s) 1092 of FIG. 10D, according to some embodiments of the invention. FIG. 10E shows that in this virtual network, the NE 1070I is coupled to NE 1070D and 1070F, which are both still coupled to NE 1070E.

FIG. 10F illustrates a case where multiple VNEs (VNE 1070A.1 and VNE 1070H.1) are implemented on different NDs (ND 1000A and ND 1000H) and are coupled to each other, and where the centralized control plane 1076 has abstracted these multiple VNEs such that they appear as a single VNE 1070T within one of the virtual networks 1092 of FIG. 10D, according to some embodiments of the invention. Thus, the abstraction of a NE or VNE can span multiple NDs.

While some embodiments of the invention implement the centralized control plane 1076 as a single entity (e.g., a single instance of software running on a single electronic device), alternative embodiments may spread the functionality across multiple entities for redundancy and/or scalability purposes (e.g., multiple instances of software running on different electronic devices).

Figure 11:
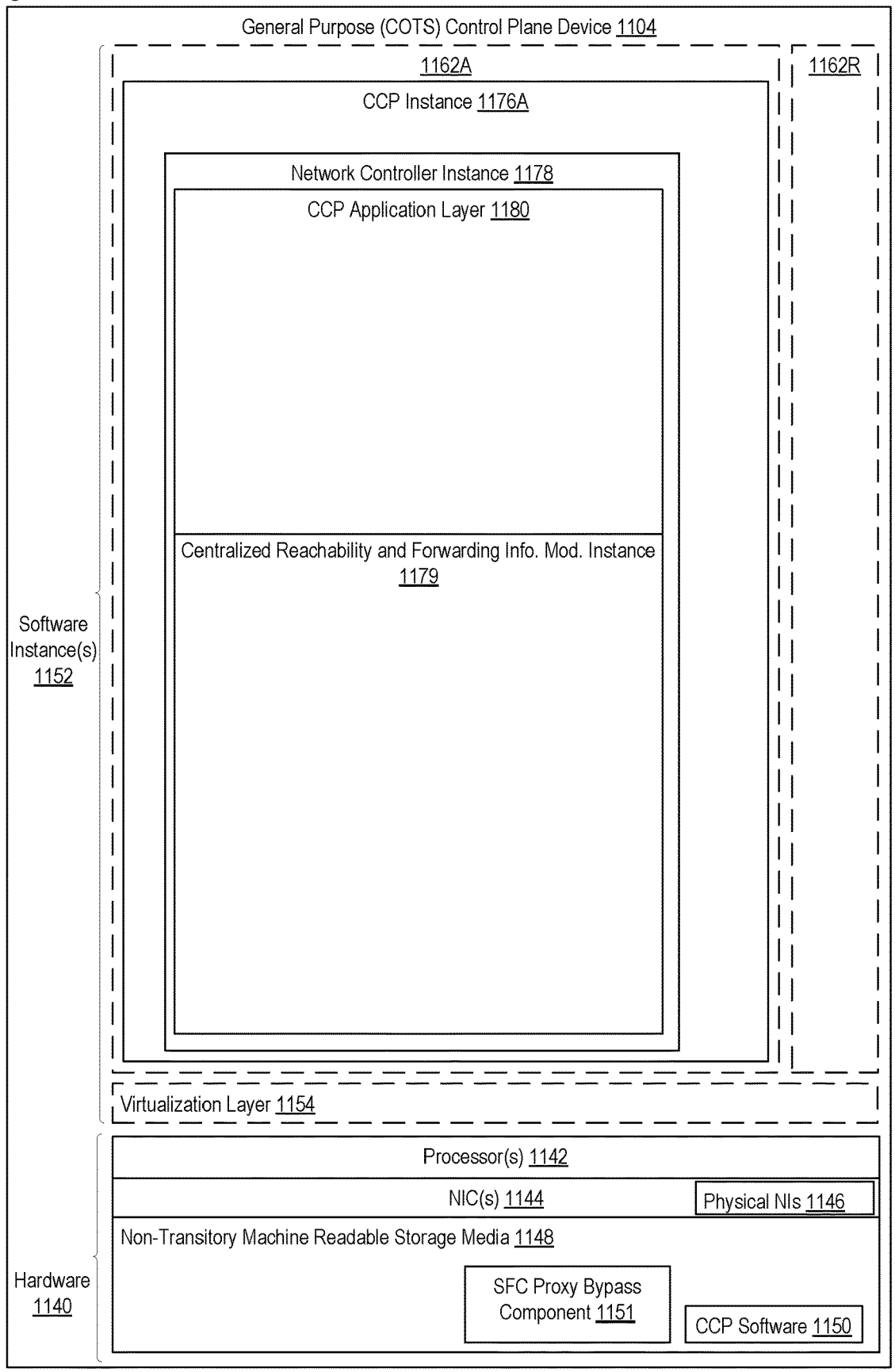
FIG. 11 illustrates a general purpose control plane device with centralized control plane (CCP) software, according to some embodiments.

Similar to the network device implementations, the electronic device(s) running the centralized control plane 1076, and thus the network controller 1078 including the centralized reachability and forwarding information module 1079, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 11 illustrates, a general purpose control plane device 1104 including hardware 1140 comprising a set of one or more processor(s) 1142 (which are often COTS processors) and network interface controller(s) 1144 (NICs; also known as network interface cards) (which include physical NIs 1146), as well as non-transitory machine readable storage media 1148 having stored therein centralized control plane (CCP) software 1150 and an SFC proxy bypass component 1151.

In embodiments that use compute virtualization, the processor(s) 1142 typically execute software to instantiate a virtualization layer 1154 (e.g., in one embodiment the virtualization layer 1154 represents the kernel of an operating system (or a shim executing on a base operating system) that allows for the creation of multiple instances 1162A-R called software containers (representing separate user spaces and also called virtualization engines, virtual private servers, or jails) that may each be used to execute a set of one or more applications; in another embodiment the virtualization layer 1154 represents a hypervisor (sometimes referred to as a virtual machine monitor (VMM)) or a hypervisor executing on top of a host operating system, and an application is run on top of a guest operating system within an instance 1162A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1140, directly on a hypervisor represented by virtualization layer 1154 (in which case the unikernel is sometimes described as running within a LibOS virtual machine), or in a software container represented by one of instances 1162A-R). Again, in embodiments where compute virtualization is used, during operation an instance of the CCP software 1150 (illustrated as CCP instance 1176A) is executed (e.g., within the instance 1162A) on the virtualization layer 1154. In embodiments where compute virtualization is not used, the CCP instance 1176A is executed, as a unikernel or on top of a host operating system, on the "bare metal" general purpose control plane device 1104. The instantiation of the CCP instance 1176A, as well as the virtualization layer 1154 and instances 1162A-R if implemented, are collectively referred to as software instance(s) 1152.

In some embodiments, the CCP instance 1176A includes a network controller instance 1178. The network controller instance 1178 includes a centralized reachability and forwarding information module instance 1179 (which is a middleware layer providing the context of the network controller 1078 to the operating system and communicating with the various NEs), and an CCP application layer 1180 (sometimes referred to as an application layer) over the middleware layer (providing the intelligence required for various network operations such as protocols, network situational awareness, and user-interfaces). At a more abstract level, this CCP application layer 1180 within the centralized control plane 1076 works with virtual network view(s) (logical view(s) of the network) and the middleware layer provides the conversion from the virtual networks to the physical view.

The SFC proxy bypass component 1151 can be executed by hardware 1140 to perform operations of one or more embodiments of the present invention as part of software instances.

The centralized control plane 1076 transmits relevant messages to the data plane 1080 based on CCP application layer 1180 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1080 may receive different messages, and thus different forwarding information. The data plane 1080 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1080, the packet (or a subset of the packet header and content) is typically forwarded to the centralized control plane 1076. The centralized control plane 1076 will then program forwarding table entries into the data plane 1080 to accommodate packets belonging to the flow of the unknown packet. Once a specific forwarding table entry has been programmed into the data plane 1080 by the centralized control plane 1076, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A software defined networking (SDN) system comprising:
   a switch;
   a service function chain (SFC) proxy; and
   a controller communicatively coupled to the SFC proxy and the switch, wherein the controller is configured to obtain a translation rule for a SFC encapsulation provided by the SFC proxy, responsive to obtaining the translation rule for the SFC encapsulation provided by the SFC proxy transmit one or more instructions to the switch to program the switch to translate packets belonging to a flow associated with the SFC encapsulation according to the translation rule for the SFC encapsulation and to forward the packets belonging to the flow associated with the SFC encapsulation to a service function (SF) in a manner that causes the packets belonging to the flow associated with the SFC encapsulation to bypass the SFC proxy, and transmit an indication to the SFC proxy that the packets belonging to the flow associated with the SFC encapsulation are to bypass the SFC proxy to cause the SFC proxy to disable timeout processing for the translation rule for the SFC encapsulation.

2. The system of claim 1, wherein the SFC encapsulation is a Network Service Header that includes a service path identifier (ID) and a service index.

3. The system of claim 1, wherein the translation rule for the SFC encapsulation includes a first rule for packets traveling from the SFC proxy to the SF, wherein the first rule includes an indication of one or more attributes that identify the SFC encapsulation, an indication of an attachment circuit associated with the SFC encapsulation, and an indication to remove the SFC encapsulation, and wherein the translation rule for the SFC encapsulation further includes a second rule for packets traveling from the service function to the SFC proxy, wherein the second rule includes an indication of an attachment circuit associated with the SFC encapsulation and an indication to add an updated SFC encapsulation.

4. The system of claim 1, wherein the one or more instructions include an instruction for the switch to remove the SFC encapsulation from packets encapsulated with the SFC encapsulation before forwarding the packets to the SF and an instruction for the switch to add an updated SFC encapsulation to packets returning from the SF.

5. The system of claim 1, wherein the one or more instructions include an instruction for the switch to forward the packets belonging to the flow associated with the SFC encapsulation to the SF on an attachment circuit.

6. The system of claim 5, wherein the attachment circuit is a virtual local area network (VLAN) circuit.

7. The system of claim 1, wherein the controller is configured to determine that the flow associated with the SFC encapsulation is to bypass the SFC proxy based on a determination that an approximate size or duration of the flow associated with the SFC encapsulation exceeds a predetermined threshold.

8. The system of claim 1, wherein the controller is configured to transmit an indication to the SFC proxy that the flow associated with the SFC encapsulation is inactive in response to receiving an indication from the switch that the flow associated with the SFC encapsulation is inactive.

9. The system of claim 8, wherein the controller is configured to transmit one or more instructions to the switch to program the switch to transmit an indication to the controller that the flow associated with the SFC encapsulation is inactive when the switch determines that the flow associated with the SFC encapsulation is inactive.

10. The system of claim 8, wherein the SFC proxy is configured to release a resource allocated for the SFC encapsulation in response to receiving the indication from the controller that the flow associated with the SFC encapsulation is inactive.

11. A method in a software defined networking (SDN) system, wherein the SDN system includes a service function chain (SFC) proxy, a switch, and a controller managing the switch, the method comprising:
   providing, by the SFC proxy, a translation rule for an SFC encapsulation to the controller;
   responsive to obtaining the translation rule for the SFC encapsulation provided by the SFC proxy, transmitting, by the controller, one or more instructions to the switch to program the switch to translate packets belonging to a flow associated with the SFC encapsulation according to the translation rule for the SFC encapsulation and to forward the packets belonging to the flow associated with the SFC encapsulation to a service function (SF)

in a manner that causes the packets belonging to the flow associated with the SFC encapsulation to bypass the SFC proxy;

transmitting, by the controller, an indication to the SFC proxy that the packets belonging to the flow associated with the SFC encapsulation are to bypass the SFC proxy; and responsive to receiving the indication that the packets belonging to the flow associated with the SFC encapsulation are to bypass the SFC proxy, disabling, by the SFC proxy, timeout processing for the translation rule for the SFC encapsulation.

12. The method of claim 11, wherein the SFC encapsulation is a Network Service Header that includes a service path identifier (ID) and a service index.

13. The method of claim 11, wherein the translation rule for the SFC encapsulation includes a first rule for packets traveling from the SFC proxy to the SF, wherein the first rule includes an indication of one or more attributes that identify the SFC encapsulation, an indication of an attachment circuit associated with the SFC encapsulation, and an indication to remove the SFC encapsulation, and wherein the translation rule for the SFC encapsulation further includes a second rule for packets traveling from the service function to the SFC proxy, wherein the second rule includes an indication of an attachment circuit associated with the SFC encapsulation and an indication to add an updated SFC encapsulation.

14. The method of claim 11, wherein the one or more instructions include an instruction for the switch to remove the SFC encapsulation from packets encapsulated with the SFC encapsulation before forwarding the packets to the SF and an instruction for the switch to add an updated SFC encapsulation to packets returning from the SF.

15. The method of claim 11, wherein the one or more instructions include an instruction for the switch to forward the packets belonging to the flow associated with the SFC encapsulation to the SF on an attachment circuit.

16. The method of claim 15, wherein the attachment circuit is a virtual local area network (VLAN) circuit.

17. The method of claim 11, further comprising:
determining, by the controller, that the flow associated with the SFC encapsulation is to bypass the SFC proxy based on a determination that an approximate size or duration of the flow associated with the SFC encapsulation exceeds a predetermined threshold.

18. The method of claim 11, further comprising:
responsive to receiving an indication from the switch that the flow associated with the SFC encapsulation is inactive, transmitting, by the controller, an indication to the SFC proxy that the flow associated with the SFC encapsulation is inactive.

19. The method of claim 18, further comprising:
transmitting, by the controller, one or more instructions to the switch to program the switch to transmit an indication to the controller that the flow associated with the SFC encapsulation is inactive when the switch determines that the flow associated with the SFC encapsulation is inactive.

20. The method of claim 18, further comprising:
responsive to receiving the indication from the controller that the flow associated with the SFC encapsulation is inactive, releasing, by the SFC proxy, a resource allocated for the SFC encapsulation.

* * * * *